(12) United States Patent
Beltran

(10) Patent No.: US 10,875,485 B2
(45) Date of Patent: Dec. 29, 2020

(54) TRIM PANEL ASSEMBLY

(71) Applicant: Nissan North America, Inc., Franklin, TN (US)

(72) Inventor: Emmanuel Martinez Beltran, Mexico City (MX)

(73) Assignee: Nissan North America, Inc., Franklin, TN (US)

( * ) Notice: Subject to any disclaimer, the term of this patent is extended or adjusted under 35 U.S.C. 154(b) by 123 days.

(21) Appl. No.: 16/181,950

(22) Filed: Nov. 6, 2018

(65) Prior Publication Data
US 2020/0139919 A1 May 7, 2020

(51) Int. Cl.
*B60R 21/216* (2011.01)
*B60R 13/02* (2006.01)
*F16B 5/12* (2006.01)
*F16B 31/00* (2006.01)
*B60R 21/213* (2011.01)

(52) U.S. Cl.
CPC .......... *B60R 21/216* (2013.01); *B60R 13/025* (2013.01); *B60R 13/0206* (2013.01); *B60R 21/213* (2013.01); *F16B 5/12* (2013.01); *F16B 31/005* (2013.01); *B60R 2021/2161* (2013.01)

(58) Field of Classification Search
CPC ................ B60R 21/213; B60R 21/216; B60R 2021/21512; B60R 2021/2161; B60R 13/0206; B60R 13/025; B60R 13/0275; F16B 5/12; F16B 31/005

See application file for complete search history.

(56) References Cited

U.S. PATENT DOCUMENTS

| | | | | |
|---|---|---|---|---|
| 5,496,060 A | * | 3/1996 | Whited | B60R 21/215 24/297 |
| 6,394,695 B1 | * | 5/2002 | Chausset | B60R 21/216 248/71 |
| 6,431,585 B1 | * | 8/2002 | Rickabus | B60R 21/215 24/114.05 |
| 7,155,783 B2 | * | 1/2007 | Nessel | B60R 13/0206 24/289 |
| 7,290,795 B2 | * | 11/2007 | Kawai | B60R 21/215 24/297 |
| 7,850,197 B2 | * | 12/2010 | Zucal | B60N 3/026 280/728.3 |
| 7,922,189 B1 | * | 4/2011 | Dillon | B60N 3/026 16/110.1 |
| 8,303,010 B2 | * | 11/2012 | She | B60R 13/025 296/1.08 |

(Continued)

FOREIGN PATENT DOCUMENTS

| | | | | | |
|---|---|---|---|---|---|
| JP | 2004161141 A | * | 6/2004 | ........ | B60R 13/0206 |
| JP | 2009074635 A | * | 4/2009 | ........... | B60R 21/216 |

*Primary Examiner* — Laura Freedman
(74) *Attorney, Agent, or Firm* — Global IP Counselors, LLP

(57) ABSTRACT

A trim panel assembly includes a trim panel configured to be removably connected to a pillar of a vehicle body structure. A connecting member includes a first part connected to the trim panel and a second part configured to be connected to the pillar. The first part is configured to be separable from the second part. A fastening member is connected between the first and second parts of the connecting member to limit a separation distance of the trim panel when the first part separates from the second part.

17 Claims, 7 Drawing Sheets

(56) References Cited

U.S. PATENT DOCUMENTS

| | | | | |
|---|---|---|---|---|
| 8,840,136 B2* | 9/2014 | Masatsugu | ............ | B60R 13/025 |
| | | | | 280/728.3 |
| 8,973,941 B2* | 3/2015 | Verner | ................. | B60R 13/025 |
| | | | | 280/728.3 |
| 9,056,593 B2* | 6/2015 | Risdale | ................. | B60R 21/216 |
| 9,475,448 B2* | 10/2016 | Benedetti | ............. | B60R 21/216 |
| 9,611,878 B2* | 4/2017 | Benedetti | ................ | F16B 5/065 |
| 9,821,747 B2* | 11/2017 | Benedetti | ............. | F16B 21/086 |
| 2007/0176399 A1* | 8/2007 | Kullack | ............... | B60R 21/215 |
| | | | | 280/728.3 |
| 2008/0235919 A1* | 10/2008 | Giddings | .............. | F16B 5/0657 |
| | | | | 24/289 |
| 2010/0320733 A1 | 12/2010 | Zucal et al. | | |
| 2011/0221170 A1 | 9/2011 | Thurston et al. | | |
| 2016/0229368 A1* | 8/2016 | Dickinson | ............. | B60R 21/216 |
| 2018/0222429 A1* | 8/2018 | Marini | ................ | B60R 13/0206 |

* cited by examiner

TRIM PANEL ASSEMBLY

BACKGROUND

Field of the Invention

The present invention generally relates to a trim panel assembly. More specifically, the present invention relates to a trim panel configured to be connected to a pillar of a vehicle body structure by a connecting member that separates upon deployment of an airbag.

Background Information

An airbag is disposed between a trim panel and a pillar of a vehicle to protect an occupant of the vehicle during an impact event. The trim panel is removably connected to the pillar of a vehicle body structure such that the trim panel at least partially separates from the pillar upon deployment of the airbag to allow for deployment of the airbag. A need exists to control the separation of the trim panel from the pillar upon deployment of the airbag disposed therebetween.

SUMMARY

An object of the disclosure is to provide a trim panel configured to be connected to a pillar of a vehicle body structure by a connecting member that separates upon deployment of an airbag.

In view of the state of the known technology, one aspect of the present disclosure is to provide a trim panel assembly including a trim panel configured to be removably connected to a pillar of a vehicle body structure. A connecting member includes a first part connected to the trim panel and a second part configured to be connected to the pillar. The first part is configured to be separable from the second part. A fastening member connected between the first and second parts of the connecting member is configured to limit a separation distance of the trim panel when the first part separates from the second part.

Another aspect of the present invention includes a vehicle body structure including a pillar and a trim panel removably connected to the pillar. A connecting member has a first part connected to the trim panel and a second part connected to the pillar. The first part is separable from the second part. An airbag is disposed between the pillar and the trim panel. The first part of the connecting member is configured to separate from the second part of the connecting member responsive to deployment of the airbag such that the trim panel disengages the pillar to allow for deployment of the airbag.

Also other objects, features, aspects and advantages of the disclosed trim panel assembly will become apparent to those skilled in the art from the following detailed description, which, taken in conjunction with the annexed drawings, discloses exemplary embodiments of the trim panel assembly.

BRIEF DESCRIPTION OF THE DRAWINGS

Referring now to the attached drawings which form a part of this original disclosure.

DETAILED DESCRIPTION OF EXEMPLARY EMBODIMENTS

Selected exemplary embodiments will now be explained with reference to the drawings. It will be apparent to those skilled in the art from this disclosure that the following descriptions of the exemplary embodiments are provided for illustration only and not for the purpose of limiting the invention as defined by the appended claims and their equivalents.

Figure 1:
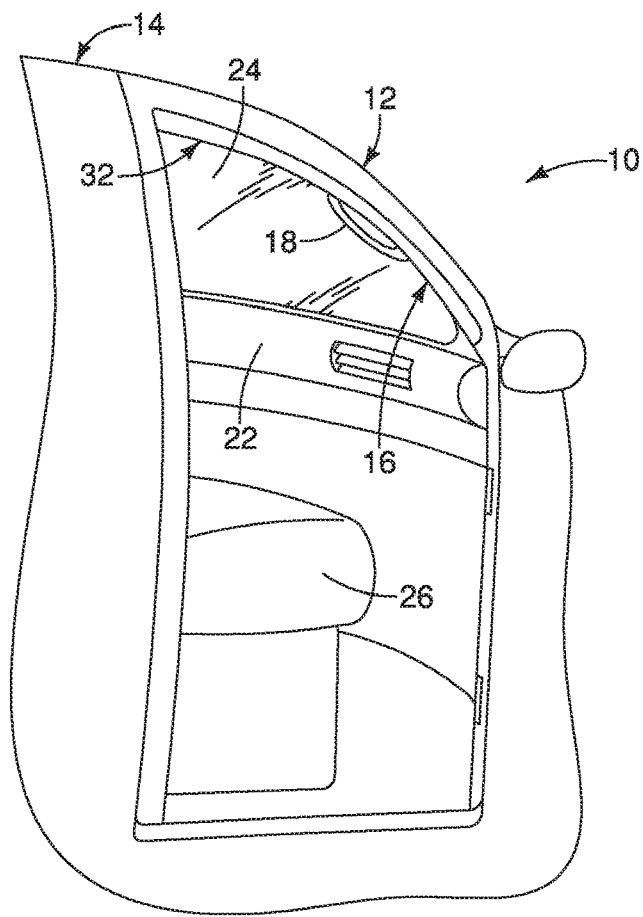
FIG. 1 is a perspective view of a portion of a vehicle with a front door removed to illustrate a trim panel assembly in accordance with an exemplary embodiment of the present invention.
Figure 2:
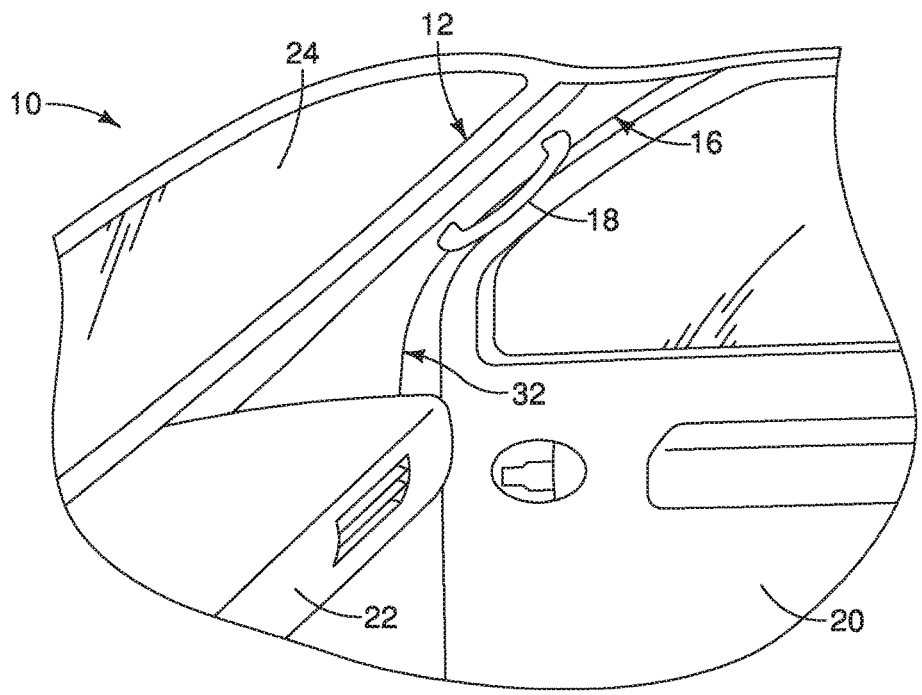
FIG. 2 is partial perspective view of the vehicle of FIG. 1 looking outboard.

Referring initially to FIGS. 1 and 2, a vehicle 10 is illustrated in accordance with an exemplary embodiment of the present invention. The pillar 12 is an A-pillar of a vehicle body structure 14 of the vehicle 10. A trim panel 16 is configured to be removably connected to the pillar 12, as described in greater detail below. A handle 18 can be connected to the trim panel 16 to provide an assist grip that helps passengers get in and out of the vehicle 10.

As shown in FIGS. 1 and 2, the vehicle 10 includes various conventional elements, such as, for example, a door 20 (the door 20 has been removed in FIG. 1 for clarity), a dashboard 22, a windshield 24 and seats 26. As shown in FIGS. 1 and 2, the dashboard 22 is a conventional vehicle component that includes a plurality of recesses 28 (FIG. 4) configured to receive the trim panel 16. The vehicle 10 also includes the pillar 12 of the vehicle body structure 14. The vehicle 10 can be any vehicle including an airbag 30 (FIGS. 3 and 4) disposed between the trim panel 16 and the pillar 12, such as an SUV, a truck, a van, or a passenger vehicle, such as a sedan or coupe.

Figure 3:
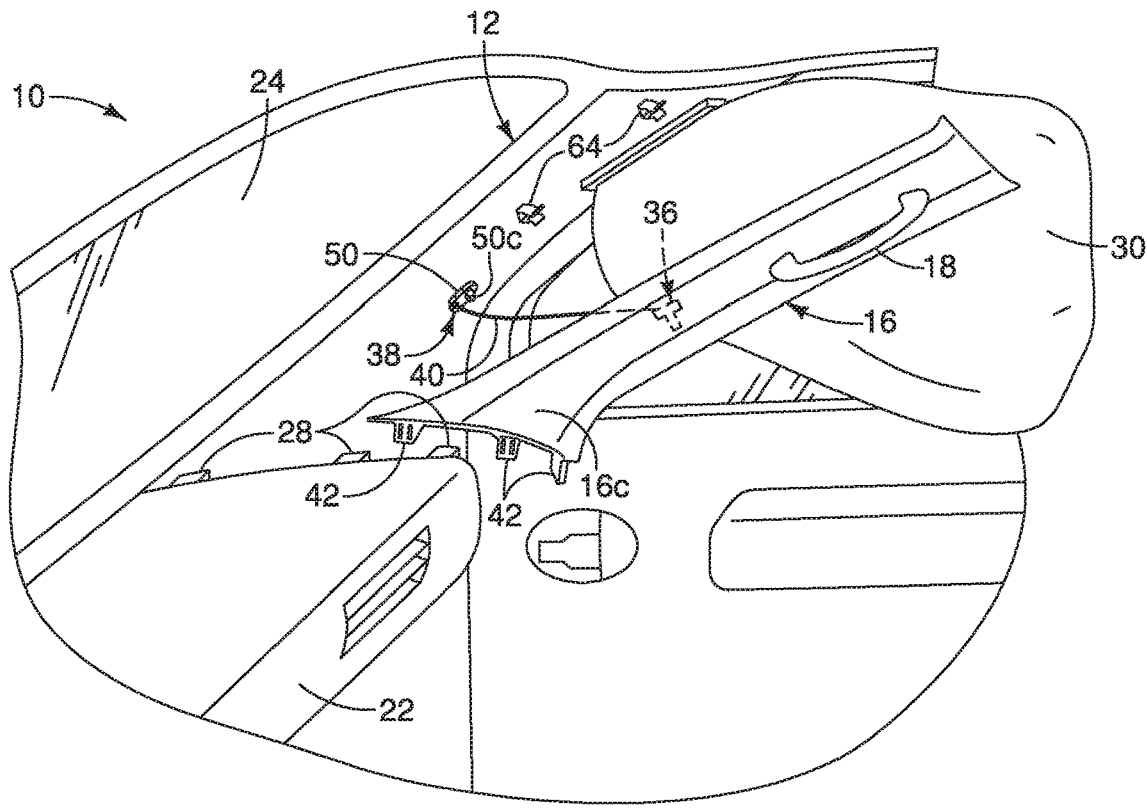
FIG. 3 is partial perspective view of the trim panel assembly of FIG. 2 in which an airbag is deployed.

As shown in FIGS. 1-3, the pillar 12 is depicted as an A-pillar of the vehicle 10. Typically, an A-pillar is a structural portion of the vehicle 10 located between the windshield 23 and the door 20 (for example, the front door, such as the passenger and driver doors). However, it should be understood from the drawing figures and the description herein that the present invention can be utilized with any pillar 12, such as an A-pillar, a B-pillar or other pillar, in which the airbag 30 is disposed between the pillar 12 and the trim panel 16.

Figure 4:
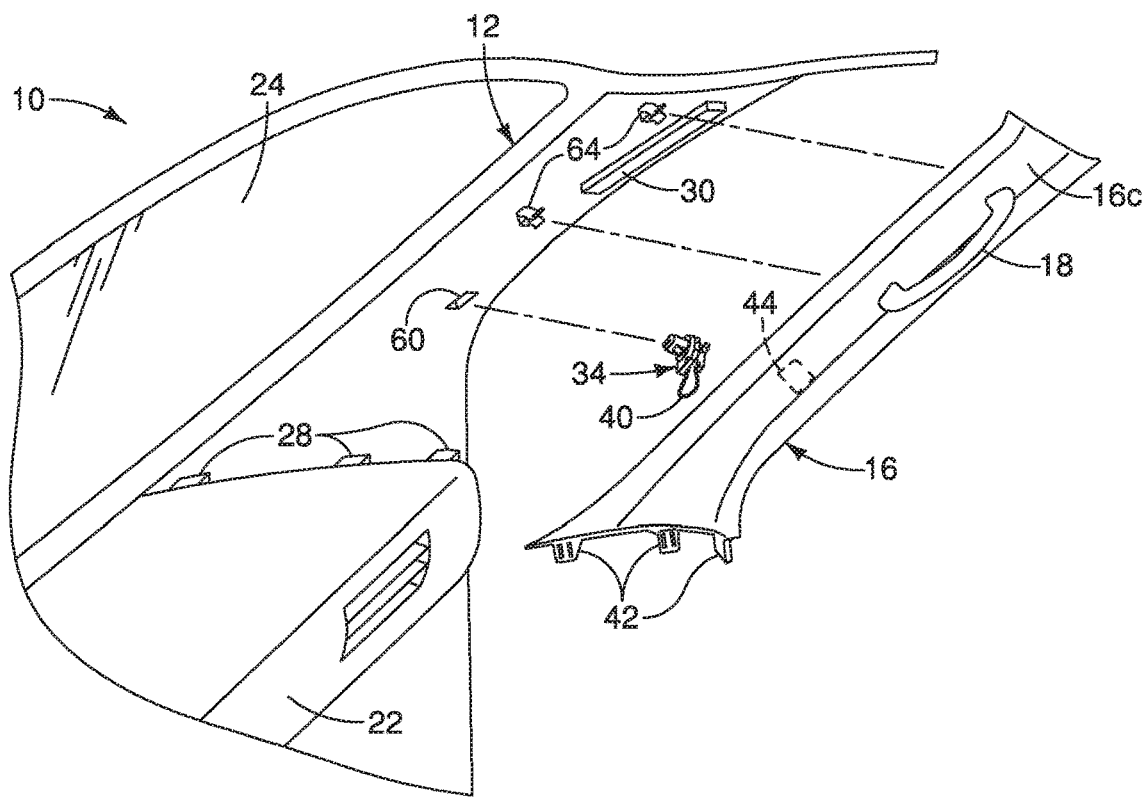
FIG. 4 is an exploded perspective view of the trim panel assembly of FIG. 2.

The airbag 30 is attached to the pillar 12 in a conventional manner such that the airbag 30 is disposed between the pillar 12 and the trim panel 16, as shown in FIGS. 2-4. The airbag 30 is preferably a safety device that is operably connected in a conventional manner to sensors and/or a control device (not shown) that activates the airbag 30 in response to an impact or collision event in a conventional manner. Preferably, the airbag 30 is an air curtain-type device dimensioned such that when deployed in response to a vehicle impact event, the airbag 30 inflates to a shape similar to an inflatable mattress or the like. As shown in FIG. 3, when deployed, the airbag 30 forms a protective cushion between a passenger and the door 20. It should be understood from the drawing figures and the description herein that the airbag 30 can also be configured to form a protective cushion between the passenger and the inner part of the roof of the vehicle 10. In other words, the specific dimensions and inflated characteristics of the airbag 30 are not limited to those depicted in FIG. 3, but can be specifically chosen depending upon the dimensions and characteristics of the vehicle 10 and the requirements of current and proposed safety standards.

Figure 6:
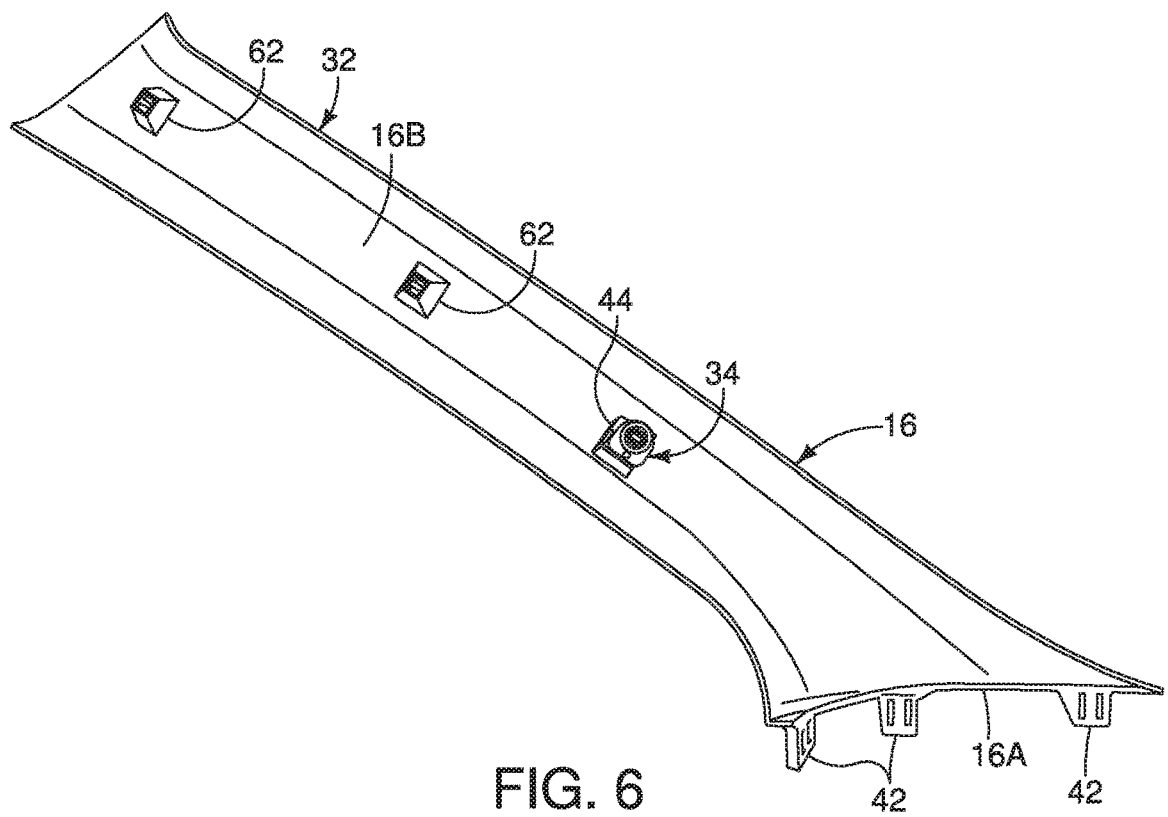
FIG. 6 is an inner perspective view of the trim panel of FIG. 2 with a connecting member connected thereto.
Figure 9:
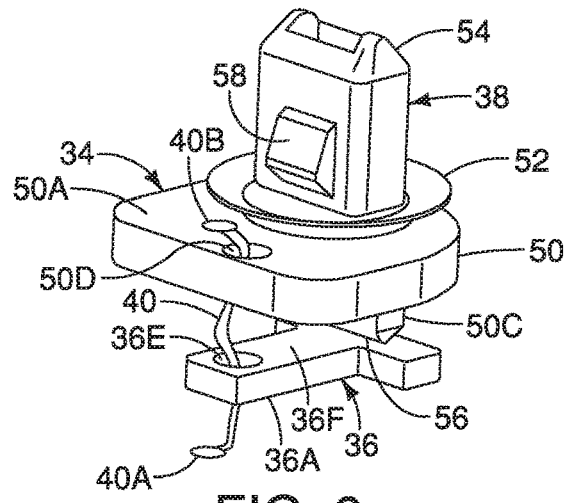
FIG. 9 is a perspective view of the connecting member of FIG. 3.

A trim panel assembly 32 in accordance with an exemplary embodiment of the present invention includes the trim panel 16 and a connecting member 34, as shown in FIG. 6. The trim panel 16 is configured to be removably connected to the pillar 12 of the vehicle body structure 14. The connecting member 34 includes a first part 36 configured to be connected to the trim panel 16 and a second part 38 configured to be connected to the pillar 12, as shown in FIG. 9. The first part 36 of the connecting member 34 is configured to be separable from the second part 38 of the connecting member 34, as shown in FIG. 3. The trim panel assembly 32 in accordance with an exemplary embodiment of the present invention can further include a fastening member 40 connected between the first and second parts 36 and 38 of the connecting member 34 to limit a separation distance of the trim panel 16 when the first part 36 separates from the second part 38, as shown in FIGS. 3, 4 and 9.

The trim panel 16 is configured to overlay a portion of the pillar 12 and conceal the airbag 30, as shown in FIGS. 1 and 2. The trim panel 16 is configured to completely separate, or breakaway, from the pillar 12 in response to deployment (inflation) of the airbag 30, as shown in FIG. 3. The trim panel 16 is also configured to separate, or move away, from the pillar 12 by no more than a predetermined distance when the trim panel 16 is separated from the pillar 12 by deployment of the airbag 30.

As shown in FIG. 3, the trim panel 16 is configured to completely separate from the pillar 12 in response to deployment of the airbag 30. As shown in FIG. 2, with the airbag 30 in an undeployed condition, the trim panel 16 completely conceals the airbag 30. The fastening member 40, as shown in FIGS. 3 and 9, is configured to limit a separation distance of the trim panel 16 with respect to the pillar 12 upon deployment of the airbag 30, thereby substantially preventing the separated trim panel 16 from being uncontrollably released into a passenger compartment of the vehicle 10.

Figure 5:
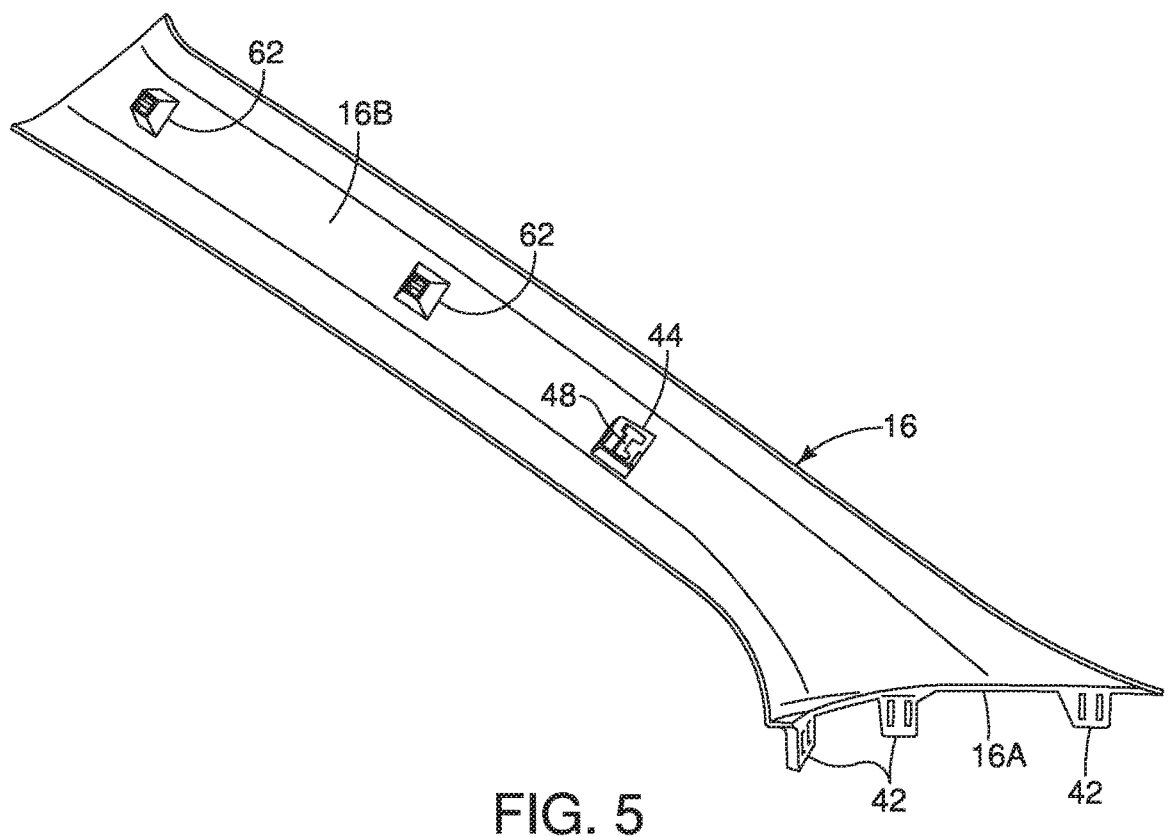
FIG. 5 is an inner perspective view of the trim panel of FIG. 2.

As shown in FIG. 5, the trim panel 16 includes a plurality of lower end projections 42, and a receiving member 44. The plurality of lower end projections 42 are configured to be received by the corresponding plurality of recesses 28 in the dashboard 22, as indicated in FIG. 4. The lower end projections 42 extend from a lower end 16A of the trim panel 16. Although the trim panel 16 is shown with three lower end projections 42 and the dashboard 22 with three recesses 28, any suitable number of projections and recesses can be used.

Figure 7:
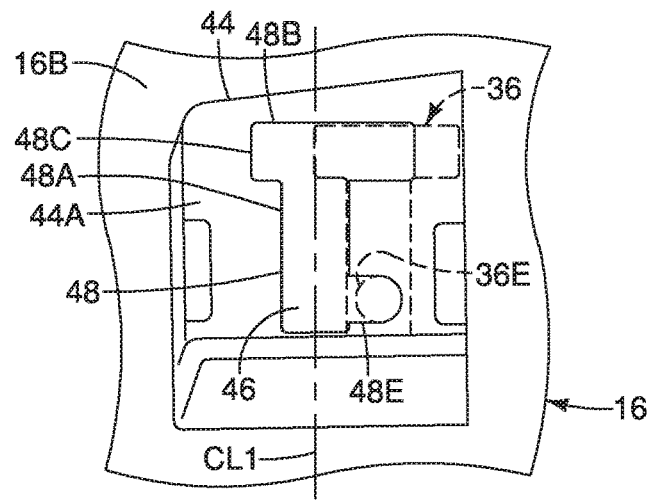
FIG. 7 is an enlarged perspective view of a receiving member of the trim panel of FIG. 2.

The receiving member 44 is disposed on an inner surface 16B of the trim panel 16. An outer surface 16C of the trim panel 16 is visible when the trim panel 16 is connected to the pillar 12 to conceal the air bag 30, as shown in FIGS. 2 and 3, such that the inner surface 16B faces the pillar 12. The receiving member 44 projects outwardly from the inner surface 16B of the trim panel 16, as shown in FIGS. 5-8, defining a receiving area 46 between an outer surface 44A of the receiving member 44 and the inner surface 16B of the trim panel 16. The receiving member 44 has an opening 48 disposed in the outer surface 44A configured to receive the connecting member 34, as indicated by dashed lines in FIG. 7. The opening 48 is substantially T-shaped, although any suitable shape can be used. The opening 48 includes a first leg 48A and a second leg 48B disposed substantially perpendicularly to the first leg 48A. A longitudinal centerline CL1 extends through a center of the first leg 48A of the opening 48. The second leg 48B has a first portion 48C and a second portion 48D linearly disposed with respect to the first portion 48C. The second portion 48D is preferably longer than the first portion 48C, i.e., the second leg 48B is not symmetrically disposed with respect to the longitudinal centerline CL1. A recess 48E extends from the first leg 48A. The recess 48E extends from the first leg 48A at a position spaced from the second leg 48B. As shown in FIG. 7, the recess 48E extends in a direction away from the longitudinal centerline CL1 in the same direction in which the second portion 48D of the second leg 48B extends.

The connecting member 34 includes the first part 36 and the second part 38, as shown in FIGS. 9-13. The first part 36 is configured to be connected to the trim panel 16, as shown in FIG. 3. The second part 38 is configured to be connected to the pillar 12. The first part 36 of the connecting member 34 is configured to be separable from the second part 38. The first part 36 of the connecting member 34 is configured to separate from the second part 38 of the connecting member 34 responsive to deployment of the airbag 30 disposed between the pillar 12 and the trim panel 16 in a state when the trim panel 16 is attached to the pillar 12, as shown in FIGS. 1-3. The separation of the first part 36 from the second part 38 of the connecting member 34 allows the trim panel 16 to disengage the pillar 12 such that the airbag 30 can properly deploy. The connecting member 34 is preferably unitarily formed as a one-piece member, such as by injection molding. The connecting member 34 is preferably made of plastic, although any suitable material can be used.

Figure 11:
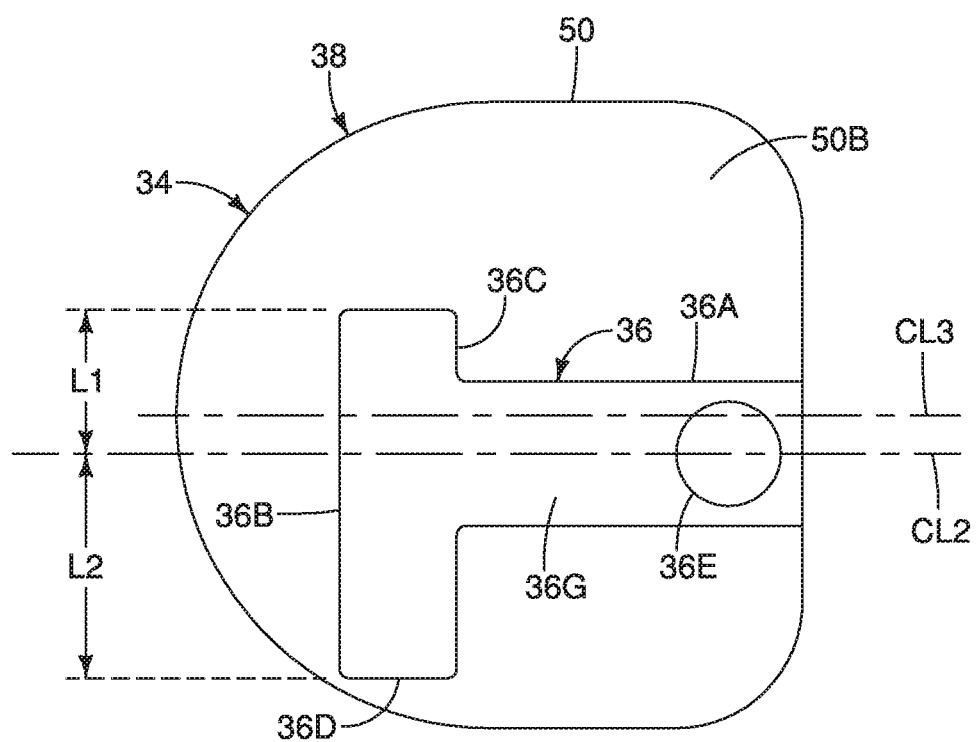
FIG. 11 is a bottom plan view of the connecting member of FIG. 9.
Figure 13:
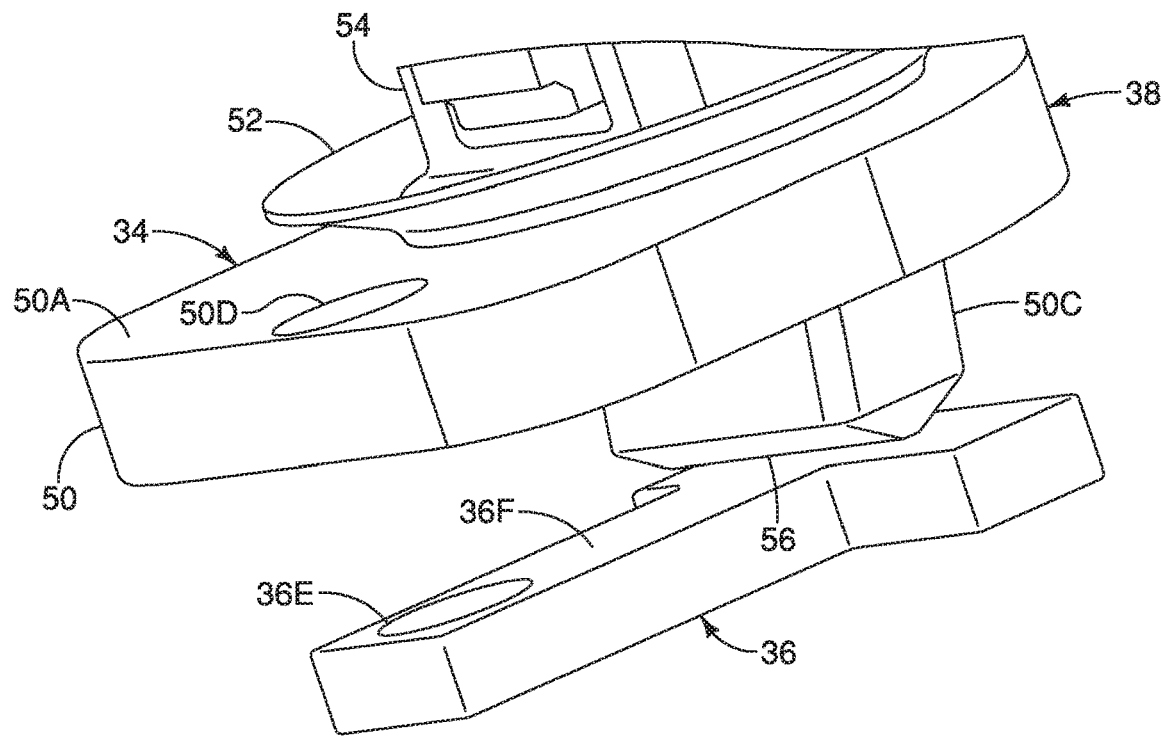
FIG. 13 is an enlarged perspective view of a frangible portion connecting a first part and a second part of the connecting member of FIG. 9.

The first part 36 of the connecting member 34 is substantially T-shaped and substantially corresponds to the shape of the opening 48 (FIG. 7) in the receiving member 44 of the trim panel 16, as shown in FIGS. 9, 11 and 13. The first part 36 includes a first leg 36A and a second leg 36B disposed substantially perpendicularly to the first leg 36A. A longitudinal centerline CL2 extends through a center of the first leg 36A. The second leg 36B has a first portion 36C and a second portion 36D linearly disposed with respect to the first portion 36C. The first portion 36C extends in a first direction from the longitudinal centerline CL2, and the second portion 36D extends in a second direction from the longitudinal centerline CL2. Preferably, the second direction is opposite to the first direction. The second portion 36D is preferably longer than the first portion 36C, i.e., the second leg 36B is not symmetrically disposed with respect to the longitudinal centerline CL2. As shown in FIG. 11, the first portion 36C has a first length L1 from a free end to the longitudinal centerline CL2. The second portion 36D has as a second length L2 from a free end to the longitudinal centerline CL2. The second length L2 is preferably larger than the first length L1.

An opening 36E is disposed in the first leg 36A. The opening 36E is preferably spaced from the second leg 36B. As shown in FIG. 11, the opening 36E extends completely through the first leg 36A in a direction substantially perpendicular to the longitudinal centerline CL2 from a first surface 36F to a second surface 36G.

Figure 12:
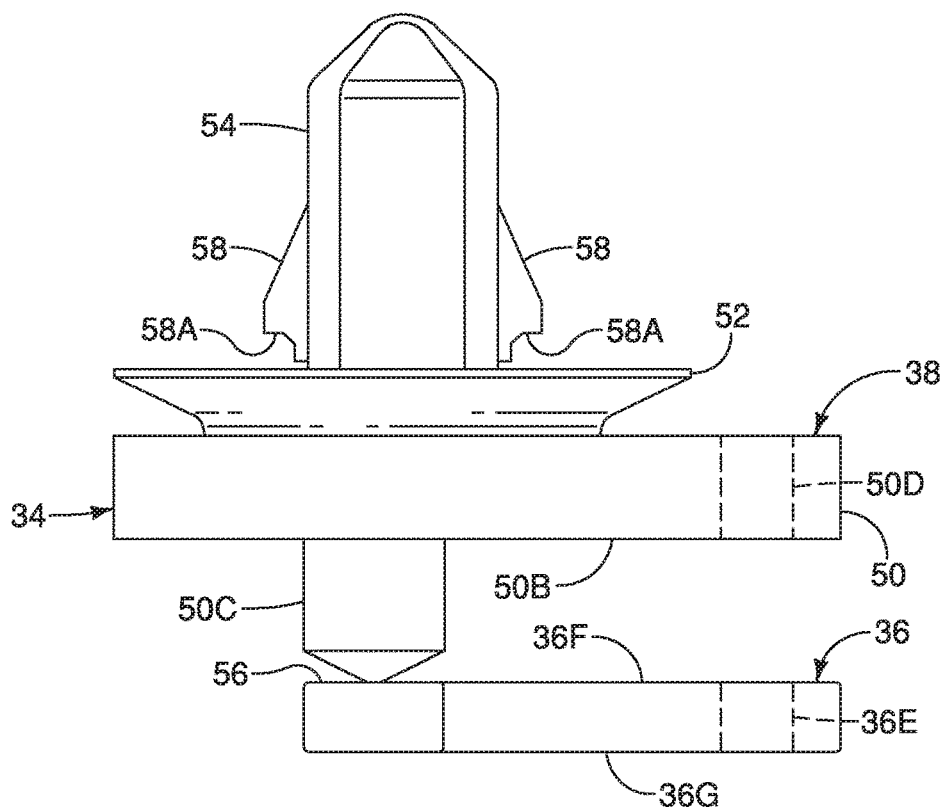
FIG. 12 is a side elevational view of the connecting member of FIG. 9.

The second part 38 of the connecting member 34 includes a base 50, a sealing member 52 and an attachment member 54, as shown in FIGS. 9-13. The base 50 has a first surface 50A and a second surface 50B. The second surface 50B of the base 50 faces the first surface 36F of the first part 36. A projection 50C extends outwardly from the second surface 50B of the base 50, as shown in FIGS. 9, 12 and 13. The projection 50C is connected to the first part 36 by a frangible portion 56 to facilitate separation of the first member 36 from the second member 38 of the connecting member 34. The projection 50C preferably extends substantially perpendicularly from the second surface 50B of the base 50. An opening 50D is disposed in the base 50 and extends from the first surface 50A to the second surface 50B. The opening 50D in the base 50 is preferably aligned with the opening 36E in the first part 36, as shown in FIGS. 9-11 and 13. The projection 50C and the opening 50D are preferably disposed at opposite ends of the base 50, as shown in FIG. 12, to prevent the projection from obstructing access to the opening 50D. A center of the opening 50D is preferably offset with respect to a longitudinal centerline CL3 of the base 50. As shown in FIG. 11, the longitudinal centerline CL3 of the base 50 is offset from the longitudinal centerline of the first leg 36A of the first part 36.

Figure 8:
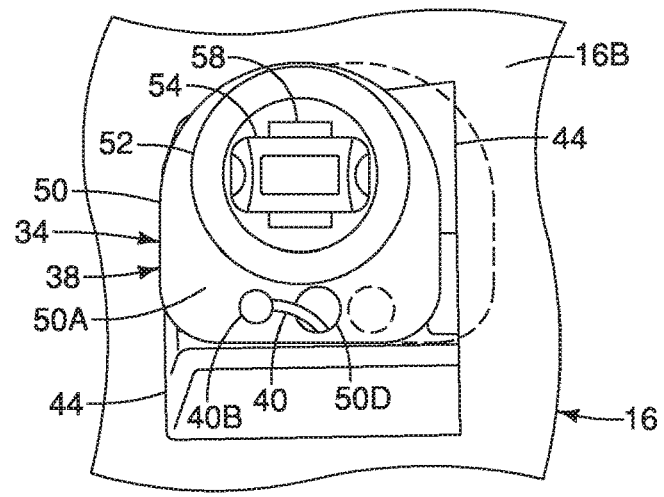
FIG. 8 is an enlarged perspective view of the connecting member received by the receiving member of the trim panel of FIG. 2.
Figure 10:
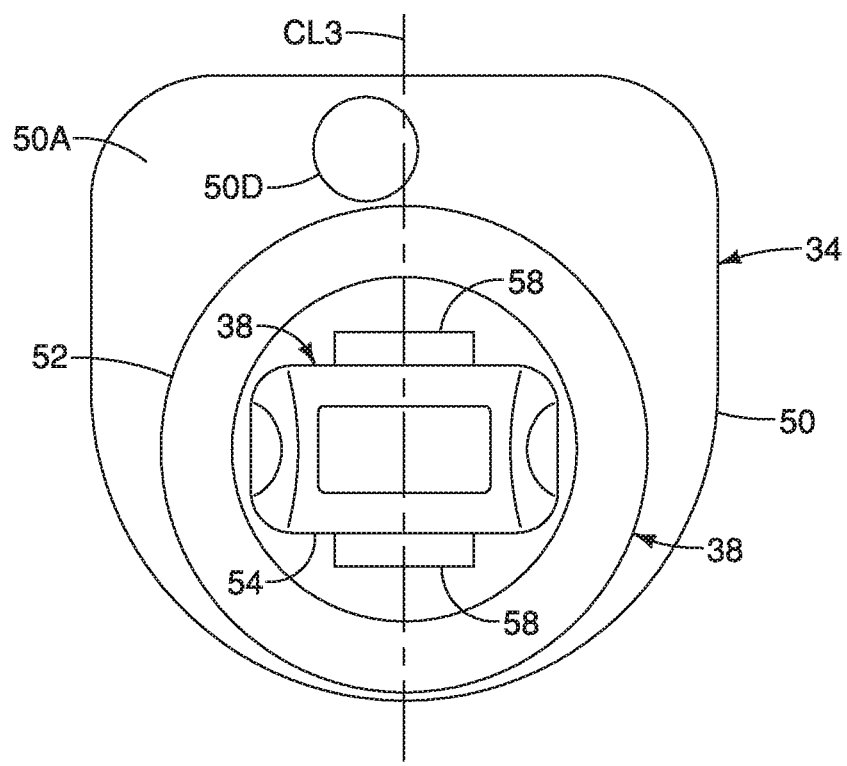
FIG. 10 is a top plan view of the connecting member of FIG. 9.

A sealing member 52 is disposed on the first surface 50A of the base 50 of the second part 38, as shown in FIGS. 8-10, 12 and 13. The sealing member 52 is substantially circular when viewed from above, as shown in FIGS. 8 and 10, and has a substantially saucer-like shape, as shown in FIGS. 12 and 13. The sealing member 52 is flexible to provide a seal with the pillar 12 when the attachment member 54 of the second part 38 is connected thereto, as shown in FIG. 3. The sealing member 52 slightly deforms when the attachment member 54 is inserted in an attachment opening 60 in the pillar 12 to provide the seal with the pillar 12 when the trim panel 16 is attached. Preferably, the sealing member 52 is disposed on the first surface 50A of the base 50 such that the sealing member 52 does not obstruct access to the opening 50D, as shown in FIG. 10. The sealing member 52 is preferably centered in a lateral direction of the base 50.

The attachment member 54 extends outwardly from the sealing member 52, as shown in FIGS. 8-10, 12 and 13. The attachment member 54 extends substantially perpendicularly to the first surface 50A of the base 50 and is preferably centrally disposed with respect to the sealing member 52. Projections 58 are disposed on opposite sides of the attachment member 54 and have shoulders 58A, as shown in FIG. 12, configured to engage an inner surface of the pillar 12 to prevent accidental removal of the inserted second part 38 of the connecting member 34 from the pillar opening 60. The projections 58 are flexible such that the projections 58 deform when the attachment member 54 is inserted in the pillar opening 60 to allow insertion of the attachment member 54. The projections 58 return to their original positions once the attachment member 54 has been inserted in the pillar opening 12, such that the projection shoulders 58A engaged the inner surface of the pillar 12 to prevent removal of the attachment member 54 of the second part 38 from the pillar 12.

A frangible portion 56 connects the first part 36 of the connecting member 34 to the second part 38 of the connecting member 34, as shown in FIGS. 9, 12 and 13. The frangible portion facilitates separation of the first part 36 from the second part 38 responsive to deployment of the airbag 30. As shown in FIG. 12, the frangible portion 56 connects the projection 50C to the first surface 36F of the first part 36 of the connecting member 34. The frangible portion 56 can be formed in any suitable manner that facilitates the first part 36 separating from the second part 38 upon deployment of the airbag 30, such as a thin-walled portion or a scored or perforated portion. As shown in FIG. 3, the first part 38 separates from the projection 50C along the frangible portion 56 of the connecting member 34. As shown in FIGS. 9, 12 and 13, the frangible portion 56 extends in a direction substantially parallel to a lateral direction of the second leg 36B of the first part 36. The frangible portion 56 extends substantially perpendicularly to the longitudinal centerlines CL2 and CL3 of the first leg 36A of the first part 36 and the base 50, respectively, as shown in FIG. 11.

Figure 16:
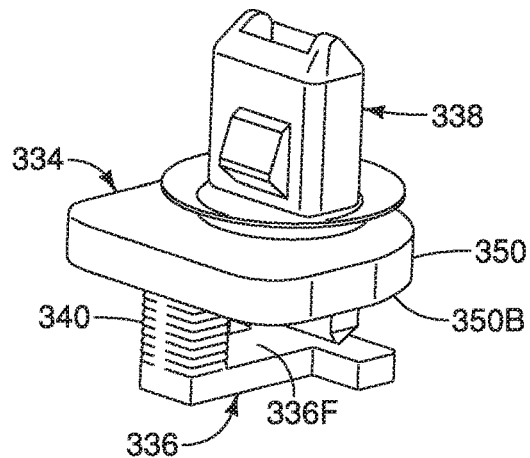
FIG. 16 is a perspective view of a connecting member in accordance with another exemplary embodiment of the present invention.

The fastening member 40 connects the first and second parts 36 and 38 of the connecting member 34, as shown in FIGS. 3, 4 and 9. The fastening member 40 limits the separation distance of the trim panel 16 from the pillar 12 when the first part 36 separates from the second part 38 responsive to deployment of the airbag 30. The fastening member 40 is illustrated as a tether, such as an elastic rope, although any suitable fastening member can be used, such as an accordion-style member shown in FIG. 16. The fastening member 40 is preferably separately formed from the connecting member 34, as shown in FIGS. 9, 12 and 13. Alternatively, as shown in FIG. 16, the fastening member 340 can be integrally formed with the connecting member 334 as a one-piece member.

A first end 40A of the fastening member 40 is received by the opening 36E in the first part 36, as shown in FIG. 9. A second end 40B of the fastening member 40 is received by the opening 50D in the base 50. The openings 36E and 50D can have smaller diameters within the first part 36 and the base 50 of the second part 36 such that a knot or an object tied to the respective ends 40A and 40B of the fastening member 40 prevents the fastening member 50 from passing through the openings 36E and 50D.

As shown in FIGS. 7 and 8, the connecting member 34 is connected to the trim panel 16 by inserting the first part 36 in the opening 48 in the receiving member 44 of the trim panel 16. The first part 36 of the connecting member 34 is movably received by the receiving member 44 between a first, or insertion, position allowing for insertion and removal of the first part 36 of the connecting member 34 and a second, or locked, position preventing removal of the first part 36 of the connecting member 34 from the receiving member 44. The first position is shown in solid lines in FIG. 8 in which the first part 36 is inserted in the opening 48 in the receiving member 44. The connecting member 34 is then moved in the lateral direction to the second position indicated by dashed lines in FIGS. 7 and 8 to retain the connecting member 34 within the receiving member 44. The recess 48E allows the fastening member 40 to exit the receiving member 44 when connected between the first and second parts 36 and 38 of the connecting member 34.

The second portion 36D of the first part 36 being longer than the first portion 36C allows the lateral movement of the first part 36 from the first position to the second position without interfering with the frangible portion 56 disposed between the first and second parts 36 and 38 of the connecting member 34. This movement is further facilitated by offsetting the base 50 of the second part 38 from the first part 36 as indicated by the offset longitudinal centerlines CL2 and CL3 (FIG. 11).

After the connecting member 34 has been connected to the trim panel 16, the trim panel 16 is removably connected to the pillar 12, as shown in FIGS. 1 and 2. The lower end projections 42 of the trim panel 16 are inserted in the pillar recesses 28 to locate the trim panel 16 with respect to the pillar 12. The attachment member 54 of the second part 38 is inserted through the attachment opening 60 (FIG. 4) in the pillar 12, thereby securing the trim panel 16 to the pillar 12. The projection shoulders 58A engage the inner surface of the pillar 12 to prevent removal of the second part 38 of the connecting member 34 from the pillar 12. Mounting tabs 62 can be disposed on the inner surface 16B of the trim panel to further secure the trim panel 16 to the pillar 12. Corresponding clips 64 can be disposed on the pillar 12 to receive the mounting tabs 62.

The frangible portion 56 of the connecting member 34 is configured to allow the first part 36 of the connecting member 34 to separate from the second part 38 of the connecting member 34 responsive to deployment of the airbag 30, as shown in FIG. 3. When the airbag 30 deploys, the connecting member 34 separates along the frangible portion 56 such that the first part 36 remains connected to the trim panel 16 and the second part 38 remains connected to the pillar 12. The fastening member 40 limits the separation distance of the trim panel 16 with respect to the pillar 12, thereby controlling the release of the trim panel 16 while not interfering with deployment of the airbag 30. The trim panel 16 is configured to completely separate from the panel 12 responsive to deployment of the airbag 30.

Figure 14:
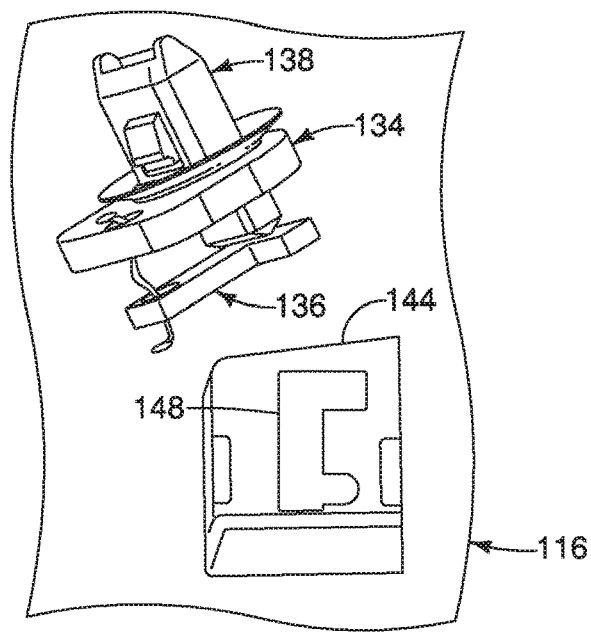
FIG. 14 is an exploded perspective view of a connecting member and receiving member of a trim panel in accordance with another exemplary embodiment of the present invention.

As shown in FIG. 14, a trim panel assembly in accordance with another illustrated exemplary embodiment of the present invention is substantially similar to the trim panel assembly 32 of the exemplary embodiment illustrated in FIGS. 1 to 13 except for the differences described below. Similar parts are identified with similar reference numerals, except increased by 100 (i.e., 1xx, accordingly).

The first part 136 of the connecting member 134 is substantially L-shaped, as shown in FIG. 14. The opening 148 of the receiving member 144 of the trim panel 116 is substantially L-shaped to movably receive the first part 136 of the connecting member 134. The two legs of the L-shaped first part 136 are disposed substantially perpendicular to one another.

Figure 15:
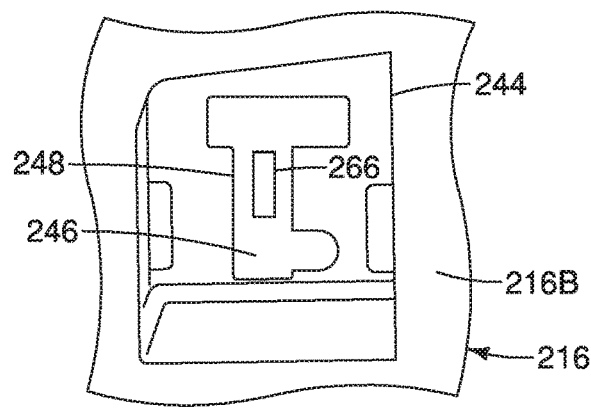
FIG. 15 is a perspective view of a receiving member in accordance with another exemplary embodiment of the present invention.

As shown in FIG. 15, a trim panel assembly in accordance with another illustrated exemplary embodiment of the present invention is substantially similar to the trim panel assembly 32 of the exemplary embodiment illustrated in FIGS. 1 to 13 except for the differences described below. Similar parts are identified with similar reference numerals, except increased by 200 (i.e., 2xx, accordingly).

The receiving member 244 includes a retention arm 266 disposed on the inner surface 216B of the trim panel 216 in the receiving area 246. The retention arm 266 can have a sloped surface to facilitate inserting the first part of the connecting member in the opening 248 in the receiving member 244. The retention arm 246 substantially prevents movement of the first part of the connecting member after insertion in the receiving member 244. Although shown on the inner surface 216B of the trim panel 216, the retention arm 266 can be disposed in any suitable location, such as on a wall of the receiving member 244. The retention arm 266 is shown as extending in a longitudinal direction of the trim panel 216, although the retention arm 266 can have any suitable configuration to prevent movement of the inserted first part of the connecting member.

As shown in FIG. 16, a trim panel assembly in accordance with another illustrated exemplary embodiment of the present invention is substantially similar to the trim panel assembly 32 of the exemplary embodiment illustrated in FIGS. 1 to 13 except for the differences described below. Similar parts are identified with similar reference numerals, except increased by 300 (i.e., 3xx, accordingly).

The fastening member 340 is a folding member having an accordion shape, as shown in FIG. 16. The fastening member 340 extends between the first surface 336F of the first part 336 and the second surface 350B of the base 350 of the second part 338 of the connecting member 334. The fastening member 340 is shown in a collapsed condition when the trim panel is connected to the pillar (FIG. 2). When the airbag is deployed, the fastening member 340 expands to allow the first part 336 to separate from the second part 338 such that the trim panel completely separates from the pillar. The fastening member 340 limits the separation distance of the trim panel with respect to the pillar, thereby controlling the release of the trim panel. Although shown as a tether in FIGS. 1-13 and an accordion-style member in FIG. 16, the fastening member can be any member suitable for limiting the separation distance of the trim panel with respect to the pillar to control the release of the trim panel.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above exemplary embodiment(s), the following directional terms "forward", "rearward", "above", "downward", "vertical", "horizontal", "below" and "transverse" as well as any other similar directional terms refer to those directions of a vehicle equipped with the trim panel assembly. Accordingly, these terms, as utilized to describe the present invention should be interpreted relative to a vehicle equipped with the trim panel assembly.

The terms of degree such as "substantially", "about" and "approximately" as used herein mean a reasonable amount of deviation of the modified term such that the end result is not significantly changed.

While only selected exemplary embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the exemplary embodiments according to the present invention are provided for illustration only, and not for the purpose of limiting the invention as defined by the appended claims and their equivalents.

What is claimed is:

1. A trim panel assembly comprising:
a trim panel configured to be removably connected to a pillar of a vehicle body structure;
a connecting member including a first part connected to the trim panel and a second part configured to be connected to the pillar, the first part being configured to be separable from the second part, a longitudinal center line of the first part of the connecting member being offset with respect to a longitudinal center line of the second part of the connecting member;
a fastening member connected between the first and second parts of the connecting member and configured to limit a separation distance of the trim panel when the first part separates from the second part, and
a frangible portion connecting the first part of the connecting member to the second part of the connecting member,
the first part of the connecting member being configured to separate from the second part upon deployment of an airbag disposed between the pillar and the trim panel in a state when the trim panel is attached to the pillar, the frangible portion facilitating separation of the first part from the second part responsive to deployment of the airbag.

2. The trim panel assembly according to claim 1, wherein a receiving member disposed on a surface of the trim panel receives the first part of the connecting member.

3. The trim panel assembly according to claim 2, wherein a retention arm disposed within the receiving member substantially prevents movement of the first part of the connecting member.

4. The trim panel assembly according to claim 2, wherein the first part of the connecting member is movably received by the receiving member between a first position allowing for insertion and removal of the first part of the connecting member and a second position preventing removal of the first part of the connecting member from the receiving member.

5. The trim panel assembly according to claim 4, wherein the first part of the connecting member is substantially T-shaped.

6. The trim panel assembly according to claim 4, wherein the first part of the connecting member is substantially L-shaped.

7. The trim panel assembly according to claim 1, wherein a first opening is disposed in the first part of the connecting member and a second opening is disposed in the second part of the connecting member, the fastening member being a tether extending between the first and second openings.

8. The trim panel assembly according to claim 1, wherein the fastening member is a folding member having an accordion shape.

9. The trim panel assembly according to claim 1, wherein the frangible portion extends substantially perpendicularly to the longitudinal center lines of the first and second parts of the connecting member.

10. A vehicle body structure comprising:
a pillar;
a trim panel removably connected to the pillar;
a connecting member having a first part connected to the trim panel and a second part connected to the pillar, the first part being separable from the second part, a longitudinal center line of the first part of the connecting member being offset with respect to a longitudinal center line of the second part of the connecting member; and
an airbag disposed between the pillar and the trim panel, the first part of the connecting member being configured to separate from the second part of the connecting member responsive to deployment of the airbag such that the trim panel disengages the pillar to allow for deployment of the airbag.

11. The vehicle body structure according to claim 10, wherein
a fastening member is connected between the first and second parts of the connecting member to limit the separation distance of the trim panel.

12. The vehicle body structure according to claim 11, wherein
a first opening is disposed in the first part of the connecting member and a second opening is disposed in the second part of the connecting member, the fastening member being a tether extending between the first and second openings.

13. The vehicle body structure according to claim 10, wherein
a receiving member disposed on a surface of the trim panel receives the first part of the connecting member.

14. The vehicle body structure according to claim 13, wherein
the receiving member projects outwardly from the surface of the trim panel.

15. The vehicle body structure according to claim 13, wherein
the first part of the connecting member is movably received by the receiving member between a first position allowing for insertion and removal of the first part of the connecting member and a second position preventing removal of the first part of the connecting member from the receiving member.

16. The vehicle body structure according to claim 15, wherein
the first part of the connecting member is substantially T-shaped.

17. The vehicle body structure according to claim 10, wherein
a frangible portion connects the first part of the connecting member to the second part of the connecting member, the frangible portion facilitating separation of the first part from the second part responsive to deployment of the airbag.

* * * * *